Sept. 30, 1952  W. P. FRANKENSTEIN  2,612,306
CARTON

Filed July 17, 1946  7 Sheets-Sheet 1

INVENTOR.
WILLIAM P. FRANKENSTEIN
BY
Joseph A. Rave
Attorney

Sept. 30, 1952 W. P. FRANKENSTEIN 2,612,306
CARTON
Filed July 17, 1946 7 Sheets-Sheet 2

INVENTOR.
WILLIAM P. FRANKENSTEIN
BY
Joseph A. Rave
Attorney

Sept. 30, 1952  W. P. FRANKENSTEIN  2,612,306
CARTON
Filed July 17, 1946  7 Sheets-Sheet 3

INVENTOR.
WILLIAM P. FRANKENSTEIN
BY
Joseph A. Rave
Attorney

Sept. 30, 1952 W. P. FRANKENSTEIN 2,612,306
CARTON
Filed July 17, 1946 7 Sheets-Sheet 4

INVENTOR.
WILLIAM P. FRANKENSTEIN
BY
Joseph A. Rave
Attorney

Sept. 30, 1952 W. P. FRANKENSTEIN 2,612,306
CARTON
Filed July 17, 1946 7 Sheets-Sheet 6

INVENTOR.
WILLIAM P. FRANKENSTEIN
BY
Joseph A. Rave
Attorney

Patented Sept. 30, 1952

2,612,306

UNITED STATES PATENT OFFICE 2,612,306

CARTON

William P. Frankenstein, Cincinnati, Ohio

Application July 17, 1946, Serial No. 684,298

17 Claims. (Cl. 229—31)

This invention relates to improvements in cartons or boxes and particularly to boxes or cartons of the "knocked down" or foldable type.

The principal object of the present invention is the provision of a foldable carton or box which when erected forms a sturdy shipping carton which may subsequently be used as a play or toy building, the carton having its exposed surfaces suitably lithographed or printed for that purpose.

Another object of this invention is the provision of a foldable carton which when erected forms a sturdy shipping container and display box for the goods therein together with a cover or lid so designed that the box or carton proper may have a portion thereof exposed to indicate the contents of the carton or box but which lid or cover positively prevents inadvertent loss of goods from the said box or carton.

A further object of this invention is the provision of a foldable carton and a foldable cover or lid so designed that a sturdy shipping carton is provided which carton and cover may be subsequently arranged with respect to one another to form a play or toy building for play purposes.

A further object of this invention is the provision of a carton or box proper together with a filler or platform which are utilized for packing and shipping goods and which carton and filler or platform may be reassembled to provide a play or toy building of novel design.

A still further object of the present invention is the provision of a carton or box together with a filler cooperating therewith to properly pack goods in said carton and a cover or lid and which carton, filler and cover may be reassembled relative to one another and adequately interlocked with one another in their reassembled positions to form a play or toy building.

It is a specific object of the present invention to provide a foldable carton or box for shipping and packing wheeled toys such as automobiles, tractors, trucks, airplanes and the like and which carton includes therein a platform or filler to adapt the carton for holding different toys, as above set forth, which are of different heights and dimensions together with a novel foldable cover or lid for securing the toys within the carton or box and which carton, filler and cover may be reassembled, upon removal of the toys therefrom, to form a play or toy building simulating a garage with a combined service station, an airplane hangar and combined operations office, or a similar building appropriate to the goods or toys in the box or carton and in which the platform or filler constitutes a roof for the toy building.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 13 is a longitudinal sectional view through the blank of Fig. 12 after the same has been folded to the position in which it is shipped to the user and seen from line 13—13 on said Fig. 12.

Throughout the several views of the drawings similar reference characters are employed to denote the same or similar parts.

As was noted above the chief purpose of the present invention is the provision of a foldable carton or box in which goods, toys for example, may be shipped and displayed and which carton is subsequently used as a toy building augmenting the enjoyment from the goods or toys shipped therein. To accomplish this the carton or box is provided with one of its ends removed so that access may be had to the interior thereof other than through the normally open top. To accommodate an open ended box or carton and prohibit loss of the goods from the carton or box a novel cover is provided which completely closes the opened end of the carton or box and which cover has its other end of considerably less height than the first end whereby it, the cover, will permit the carton end to be observed and the cover can be used as an auxiliary toy building or as an appurtenance to the toy building with an open doorway permitting access thereto. To complete and dress up the building or buildings there is provided extraneous pieces which cooperate with the said building or buildings to form a roof above the building. It has been found that the roof piece may, in some instances, be employed within the carton or box to act as a filler or platform in accommodating articles of different heights within the carton.

With these and other purposes in view the carton and associated parts are, specifically, as follows.

Figure 1:
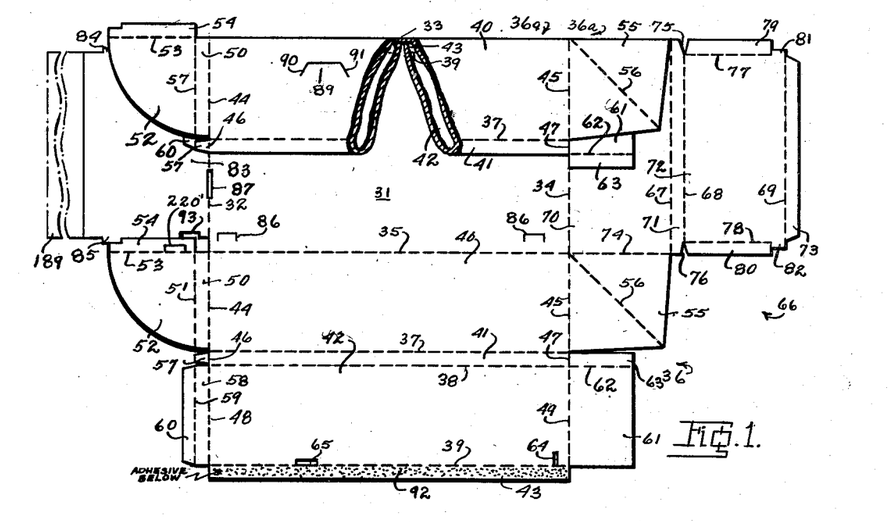
Fig. 1 is a plan view of a card board or the like blank from which one form of carton proper may be made, the drawing showing a portion thereof cut away to more clearly illustrate the construction.

The main carton or box is formed from a single blank of Fig. 1 which comprises a bottom panel or member 31 bounded by score or fold lines 32, 33, 34 and 35 which hingedly connect to the bottom extensions forming the upstanding walls of the carton. Score or fold lines 33 and 35 connect similar extensions 36 and 36a wherefore it is deemed sufficient if but one of them be described in detail.

Extension 36 is of a length substantially equal to the length of the bottom 31 and is subdivided by parallel score or fold lines 37, 38 and 39 into panels 40, 41, 42 and 43. The panel 41 in the erected carton constitutes the side wall outer wall member and has its ends defined by score or fold lines 44 and 45. The panel 41, in the erected carton, forms the side wall top wall member and it has its ends defined by score or fold line 46 in one instance and by a cut line 47 in the other. The panel 42 constitutes, in the erected carton, the side wall inner wall member and like the outer wall member has its ends defined by score or fold lines 48 and 49. The end boundaries of each of panels 40, 41 and 42 are in alignment as is the ends of the panel 43 and which panel 43 constitutes a glue flap for securing the side wall in position.

The outer wall member panel 40 through its score or fold line 44 has hingedly connected thereto the side wall end wall closure panel 50 which through a score or fold line 51 in turn has hingedly connected thereto a locking flap 52. The locking flap 52 is illustrated as having an arcuate outer edge which is more for decorative purposes than utilitarian. In other words, the locking flap 52 may have its sides at right angles to one another or may have any other configuration. The locking flap 52 has along one edge, at substantially right angles to the score or fold line 51, a second score or fold line 53 which hingedly connects thereto a panel 54 acting as a hold down flange for said flap. The outer wall member panel 40 through the score or fold line 45, at its other end, has hingedly connected thereto a corner piece 55 provided diagonally thereof with a score or fold line 56. This corner piece 55 is known in the trade as a "bellows" corner and in effect constitutes a tucking flap in the erected carton.

The top wall member panel 41 through its score or fold line 46 hingedly connects thereto a foldable tab 57 which cooperates with the end wall closure panel 50 in closing the end of the erected carton side wall as will later be made clear.

The inner side wall panel 42 through its score or fold line 48 has hingedly connected therewith a panel 58 in turn provided with a score or fold line 59 to provide hingedly thereon a closure flap 60. The panels 58 and 60 are utilized as a closure for the end of the side wall and for effecting a definite spacing of this end of the side wall inner and outer wall members and to effect a reinforcement thereof as will later be made clear.

The inner wall member panel 42 through its score or fold line 49 has hingedly connected therewith a tucking flap 61 provided with a score or fold line 62 which hingedly connects to the tucking flap 61 a spacer flap 63 utilized in spacing the end or back wall members from one another. The inner side wall panel 42, adjacent its score or fold line 49, is provided with an elongated aperture 64 utilized in locking the end or back wall members in position and said inner wall member 42 is further provided with an elongated horizontal aperture 65 for locking in position either a supplemental bottom or a bottom flap as will later be pointed out.

The bottom panel 31 through the score or fold line 34 has connected therewith an extension 66 which in the erected carton constitutes the end or back wall. This extension 66 is provided with a plurality of parallel fold or score lines 67, 68 and 69 which subdivide the said extension into panels 70, 71, 72 and 73. The panels 70, 71, 72 and 73 are folded to be normal to one another and constitute, respectively, the end or back wall outer wall member, top wall member, inner wall member and spacing flap. The end or back wall outer wall member 70 has its ends defined by score or fold lines 74 which hingedly connect therewith the adjacent edge of the bellows corner piece 55.

The top wall panel 71 has its ends biased or otherwise contoured as at 75 and 76 which is for a dual purpose, namely, decorative and utilitarian. The said contours 75 and 76 reduces the width of the inner wall member or constitutes a connecting line between the ends of said inner wall member 72 and the ends of the outer wall member 70 and gives to the erected carton finished corners.

The end wall inner wall member 72 has its ends, for the major portion thereof, defined by score or fold lines 77 and 78 which are substantially at the outer terminus of the contours 75 and 76 and in effect shorten the said inner wall member a distance equal to the width of the top wall members 41 of the side walls. The said score or fold lines 77 and 78 respectively hingedly connect with the end wall inner wall member 72 spacing flaps 79 and 80 which in the erected carton space the sides of said end wall members from one another. Beyond the said spacing flaps 79 and 80 the inner wall member 72 has projecting therefrom locking tabs 81 and 82.

The bottom panel 31 through its score or fold line 32 hingedly connects with the said bottom panel 31 a locking panel 83 which in the erected carton folds onto the bottom panel 31 and impinges there under the hold down flaps or flanges 54 of the locking flaps 52. In order to secure the panel 83 in position it has projecting from its opposite sides locking tabs 84 and 85 which, as will later be made clear, interlock with apertures 65 formed in the side wall inner wall members 42.

Figure 2:
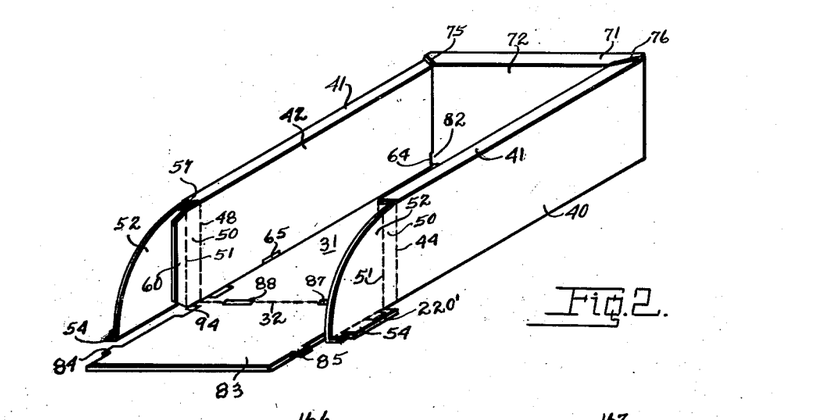
Fig. 2 is a perspective view of a carton partly erected from the blank of Fig. 1.
Figure 3:
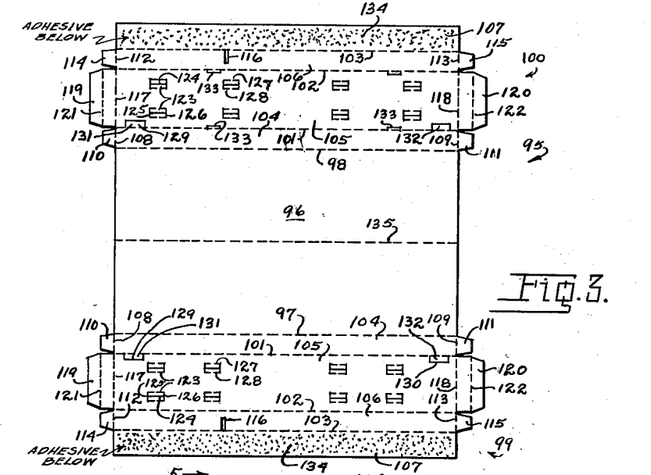
Fig. 3 is an extended plan view of a platform or filler that may be used with the carton of Figs. 1 and 2.
Figure 4:
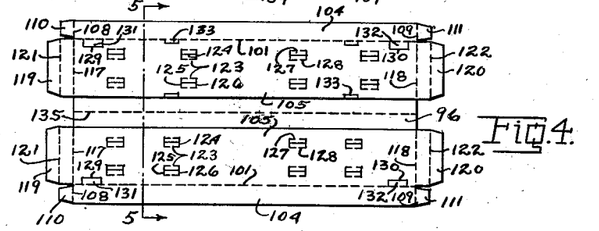
Fig. 4 is a plan view of the platform of Fig. 3 folded flat as shipped to the user.
Figure 5:
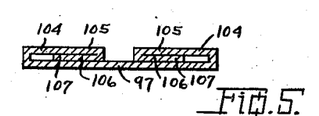
Fig. 5 is a transverse sectional view through the folded blank of Fig. 4 as seen on line 5—5 on said Fig. 4.

The bottom panel 31 near each of its corners is provided with a substantially U-shaped slit 86 which is utilized in assembling the various units or elements of the carton into a play or toy building as will later be made clear. The said bottom panel 31 is furthermore provided, along the score or fold line 32, with a pair of elongated apertures or slits 87 and 88, only one of which is illustrated in Fig. 1 while both are illustrated in Fig. 2.

During the cutting and forming of the blank one of the side walls outer wall members 40, that of the extension 36a, for example, is provided with a cut or slit whereby there is provided a tab 89 having its sides outwardly and downwardly flaring as at 90 and 91. As just mentioned above this tab is provided in only one of the side walls and is utilized in forming the toy building to have secured thereto the cover or lid of the shipping package all as will be more clearly described hereinafter.

It should be noted that the blank has either previously or is at this time lithographed or printed to simulate a building, the building depending upon the goods, toys or the like packed therein or depending upon the kind of a toy building it is intended to supply.

The blank is now folded to the position it is to have for shipment to the ultimate user. The folding is as follows: The inner wall member 42 along with the glue flap 43 are folded on the score or fold line 38 to be superimposed on the top wall panel 41 and outer wall member 40. Adhesive is now applied to the now exposed surface of the glue flap 43 or the adhesive may have previously been applied to said flap 43 by an "undershot" gluepot on the blank forming machine, whereupon the flaps 36 and 36a are folded on their respective score or fold lines 33 and 35 to be superimposed on the bottom panel 31. This folding will bring the glue flap 43 with its adhesive onto the bottom panel 31 in the zone or space between the score or fold lines 33 and 35 and the slits 86 inwardly spaced therefrom. Pressure is now applied to secure the parts through the adhesive 92 to one another. Each side wall extension 36 and 36a is now in the position illustrated by the extension 36a in the upper part of Fig. 1. It is in this position that the blank is shipped to the user.

Upon desiring to place merchandise in the carton the user first raises the side walls to be normal to the carton bottom panel 31 whereupon they will be in the positions illustrated in Fig. 2. In order to retain the side walls in this position the end or back wall is now assembled. The tucking flaps 61 are folded on their score or fold lines 49 to be transversely of the bottom panel 31 whereupon the spacer flaps 63 are folded to be normal to the tucking flaps and parallel with the bottom panel 31. The extension 66 is now raised to be normal to the bottom panel 31 and which automatically causes the bellows corner pieces 55 to be folded on themselves on the diagonal fold line 56 and at the same time to be transversely of the bottom panel 31. The end or back wall panels 71, 72 and 73 are now folded to be normal to one another having previously folded the spacing flaps 79 and 80 to be upstanding from the inner wall member 72. This folding of the end or back wall members encloses within them the bellows corners 55, tucking flaps 61 and spacer flaps 62. The said end or back wall is now erected as shown in Fig. 2. In order to hold this end wall erected the locking tabs 81 and 82 are inserted in the inner wall member elongated apertures 64.

It should be noted that the locking panel 83 is provided in its sides near the score or fold line 32 with indentations 93 and 94, the former of which is illustrated in Fig. 1 while the latter is illustrated in Fig. 2. These indentations 93 and 94 coincide with the U-shaped slits 86 when the locking panel 83 is in position so as to afford no interference with the attaching to the carton of the roof when the package is set up as a play or toy building.

It should also be noted the locking flanges 54 are each provided with a U-shaped slit 220 which, when the said locking flanges 54 are in operative positions, coincide with the bottom panel slits 86 to accommodate the roof attaching means.

To be utilized with the carton of Fig. 2, when the merchandise to be packed therein justifies same, is a platform illustrated in Figs. 3 to 6 inclusive. This platform is formed of a substantially rectangular piece of paper or cardboard material and is indicated in general by the reference numeral 95. The blank 95 has a central or main panel 96 of an area substantially co-extensive with that of the carton bottom panel 31 between the inner wall members when set up. Two opposite sides of the panel 96 are defined by score or fold lines 97 and 98 which respectively hingedly connect thereto similar extensions 99 and 100, which are substantially identical and it is considered sufficient if but one of them be described in detail.

The extensions 99 is subdivided by a plurality of score or fold lines 101, 102, and 103 into a plurality of panels 104, 105, 106 and 107. These panels 104 to 107 inclusive are adapted to be disposed normal to one another thereby providing upstanding tubular portions along the sides of the platform main panel 96 as clearly illustrated in Figs. 5 and 6.

The panel 104 which in the erected platform forms the tubular outer member has its ends defined by score or fold lines 108 and 109 which respectively hingedly connect to the panel 104 tabs 110 and 111 which cooperate in holding the tubular portions in operative position. The panel 106 forms in the erected platform the inner wall member of the tube and like the panel 104 has its ends defined by score or fold lines 112 and 113 again respectively hingedly connecting to the panel 106 tabs 114 and 115 which serve a similar function as the tabs 110 and 111. Intermediate the score or fold lines 112 and 113 the panel 106 is provided with a transverse perforation 116 which is adapted to receive and position a block for the goods in the carton and on the platform as will later be made clear.

The panel 105, which in the erected platform constitutes the top of the tubular portion has its ends defined by score or fold lines 117 and 118 which hingedly connect to the panel 105 tubular closing flaps 119 and 120 each provided with a score or fold line 121 and 122 to form therein the closure member and the tucking flaps which hold the tubular portions of the platform erected. Intermediate the score or fold lines 117 and 118 the panel 105 is provided with spaced cutouts or apertures 123 which may conveniently consist of a single cut 124 with right angle cuts 125 and 126 at their ends thereby providing flaps which may be bent or depressed, respectively, on score or fold lines 127 and 128. These cutouts or apertures 123 are so spaced as to receive portions of articles packed or disposed on the platform and act as positioning means therefor. The panel 105 is further provided near its ends and extending outwardly from the score or fold line 101 with U-shaped slits 129 and 130 thereby providing, when the platform is erected, lugs 131 and 132 which upstand from the platform tubes as illustrated most clearly in Fig. 6. The panel 105 of the extension 100 is further provided, in operative relation with the apertures 123, with longitudinally extending apertures 133 which are utilized for receiving a tie member for tying or anchoring the goods to the platform as will later be made clear.

After the platform blank 95 has been cut and scored as above described the flap 107 is folded on the score or fold line 103 and adhesive 134 applied thereto unless said adhesive was previously applied by an undershot gluepot during the formation of the blank 95. The extensions 99 and 100 are then respectively folded on the score or fold lines 97 and 98 to bring the adhesive 134 of each glue flap 107 into contact with the platform body portion 96 whereupon the blank is in the position illustrated in Figs. 4 and 5 and ready for shipment to the user. It will be appreciated that the tubular portions of the platform are folded flat onto the platform body portion 96 as most clearly illustrated in section in Fig. 5.

It should be noted that during the formation of the platform blank 95 its body portion 96 was provided centrally thereof with a score or fold line 135 which, as will later be made clear, is employed in arranging or assembling the parts for use as a toy or play building.

The user sets up the platform by raising the tubular side portions thereof to have their inner and outer members 104 and 106 normal to the body portion 96 whereupon the tabs, 111 and 115, for example, are disposed toward one another transversely of the tubes and the closure flap 120 arranged to close the end of the tube and held in position by inserting the tucking portion thereof beneath the tabs 111 and 115 into the tube proper. The other end of the tube is then similarly closed by disposing tabs 110 and 114 toward one another and enclosed by the closure flap 119.

In the particular example illustrated in the drawings the platform tubes are respectively adapted to support toy or miniature automobiles and trucks while the portion of the platform body 96 between said tubes is adapted to support a relatively long trailer on which the toy or miniature automobiles and trucks may be mounted. The said toy or minature automobiles and trucks are positioned on the platform tubes by having their wheels inserted within the apertures 123 in the tube top portions 105 and which apertures 123 are positioned to receive said wheels.

Figure 9:
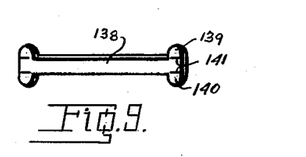
Fig. 9 is a perspective view of a strap utilized in holding certain of the goods in position on the platform.

It will be appreciated that the height of the several toys, if made in proportion to their prototype, are dissimilar and, as will later appear, certain of these toys will be held against displacement on the platform by the carton cover or lid while others being shorter require anchoring or tie means. This last mentioned condition exists with respect to the toy or miniature automobile 136 wherefore use is made of a band 137 to hold same in position. The band 137 is illustrated in Fig. 9 and is cut from paper or cardboard stock and comprises a central relatively narrow elongated body portion 138 having projecting from each side thereof at its ends ears 139 and 140. The said ears 139 and 140 are adapted to be projecting through the apertures 133 in the platform tube top 105 and engage the under surface of said platform top at each end of the apertures 133. In order that the said ears 139 and 140 may be readily inserted through said apertures 133 they are connected with the band body portion by score or fold lines 141 whereby they may be folded onto the band prior to insertion through said apertures and then open out to their operative engaging positions.

The toy or miniature automobile 136 and the toy or miniature truck 142 are held against axial movement by the cooperation of the apertures 123 and the wheels of said toys. The toy or miniature trailer 143 however has no means for engaging its wheels to prohibit this movement thereof. In order therefore to hold the trailer 143 from axial movement use is made of a block 144 transversely of the platform and adapted to engage a projection 145 below said trailer 143. The block 144 is cut or dried from paper or cardboard stock as a blank illustrated in Fig. 10 and is symmetrical on each side of its longitudinal center.

This block blank is therefore provided centrally with a score or fold line 146 having on each side thereof panels 147 and 148 separated from one another by a score or fold line 149. Each of the panels 147 is of greater length than its adjacent panel 148 thereby providing ears 150 and 151 beyond the panel 148.

The blank is folded as illustrated in connection with the modified block of Fig. 11 on its central score or fold line 146 thereby bringing the under surface of panels 147 into contact with one another whereupon the panels 148 are folded outwardly to be normal to the panels 147 whereby the ears 150 and 151 project beyond said panels 148. The block is mounted in operative positions by inserting the ears 150 and 151 into the aligned and opposed vertical apertures 116 in the tubular inner members 106.

Figures 10, 11, 14:
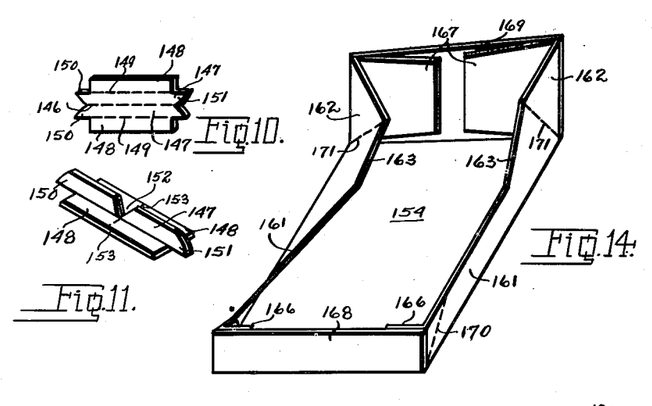
Fig. 10 is a perspective plan view of a blank forming a block or positioning member for certain of the toys illustrated in Fig. 8 and forming a detail of the invention.
Fig. 11 is a perspective view of an erected or assembled block showing a modification therein over the block of Fig. 10.
Fig. 14 is a perspective view of the cover or lid in a substantially erected position and illustrating the mode or method of erecting the same.

The modified block in Fig. 11 is modified to the extent that a diamond shaped cutout is formed substantially centrally of the panels 147 which when erected form the V-shaped notch 152. Extending transversely of the panels 148 from the apex of the notch 152 are score or fold lines 153. The purpose for this construction is, as will later be made clear, to permit the block to remain in assembled position on the platform when the said platform is utilized as the roof for the play or toy building.

Figure 6:
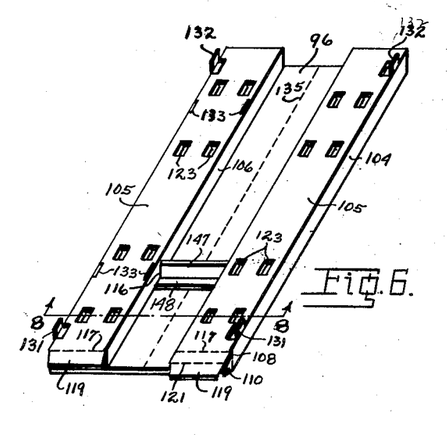
Fig. 6 is a perspective view of the platform of Figs. 3, 4 and 5 in a substantially erected condition.
Figure 8:
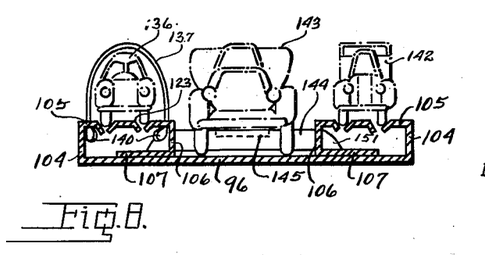
Fig. 8 is a transverse sectional view through the platform of Fig. 6 showing the same supporting goods, toys, shipped therein with said view of the platform taken on line 8—8 on said Fig. 6.
Figure 12:
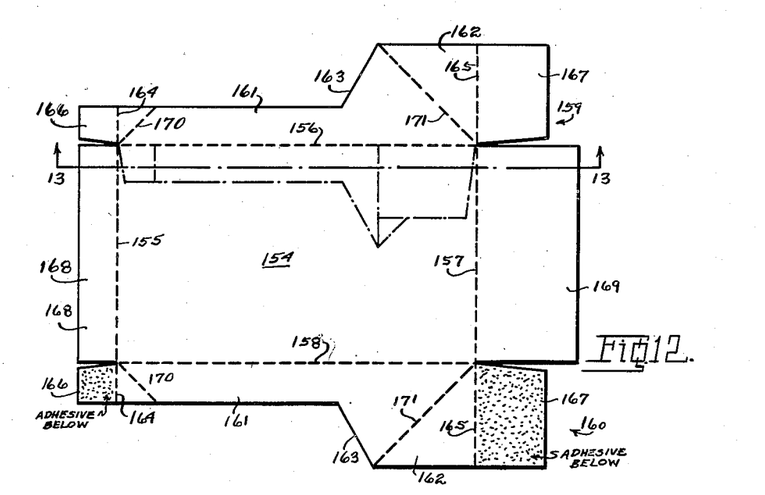
Fig. 12 is an extended plan view of a blank from which the cover or lid for the carton of this invention is made.

To utilize the carton of Fig. 1 with its assembled platform of Figs. 6 and 8 as a shipping container a cover or lid as illustrated in Figs. 12, 13 and 14 is employed. The said cover or lid, as pointed out above, is further utilized as a part of or as an auxiliary to the carton in forming the toy or play building and while its general construction is not novel it does involve novel features and is formed from a single blank of cardboard illustrated in plan in Fig. 12.

The cover comprises a main or top panel 154 bounded by score or fold lines 155, 156, 157 and 158. The score or fold lines 156 and 158 respectively hingedly connect to the top panel 154 extension panels 159 and 160 which are identical and it is therefore deemed sufficient if but one of them be described in detail. The extension 160 is in the form of a panel having a narrow portion 161 and a wider portion 162 connected to one another by an inclined line 163. It should be noted that the line 163 while illustrated and described as an inclined line may be arcuately or otherwise shaped so long as there is a connection between the narrower portion 161 and 162. It should further be noted that the width of the wider portion 162 is equal to the full height of the carton side with which it is to be used namely the side walls of the carton of Fig. 2. The ends of the extension 160 is defined by score or fold lines 164 and 165 which respectively hingedly connect to the said extension panel glue flaps 166 and 167.

The remaining score or fold lines 155 and 157 of the cover panel 154 respectively hingedly connect thereto panels 168 and 169 which are respectively of a width equal to the width of the ends of the side panels adjacent thereto.

The extension panels 159 and 160 are each provided near its opposite ends with a diagonal score or fold line 170 and 171 thereby providing a triangular portion at said ends of the extension panels.

After the blank has been cut and scored the panel extensions 159 and 160 are respectively folded on their score or fold lines 156 and 158 to be in face contact with the cover top panel 154 whereupon the triangular portions at the ends of said panels are folded back onto the panels on their score lines 170 and 171. The glue flaps 166 and 167 are now folded on their respective score or fold lines 164 and 165 onto the now exposed surface of the panel extensions triangular portions. The said panels 159 and 160 are now in the position illustrated in phantom lines in Fig. 12. Adhesive is now applied to the exposed surfaces of the glue flaps 166 and 167 unless the adhesive were applied prior to the folding of said extension panels. The flaps or cover end flanges 168 and 169 are now folded onto the cover panel 154 and glue flaps 166 and 167 and pressure applied to effect an adhesion of the said panels and glue flaps. The parts are now in the position illustrated in cross section in Fig. 13 and it is in this position that the cover is shipped to the user.

The user upon desiring to set up the lid or cover for use merely lifts the cover end flanges 168 and 169 to be upstanding or normal to the cover top panel 154. This movement of the said end flanges 168 and 169 automatically raises the cover side flanges or extension panels 159 and 160 to be in the position illustrated in Fig. 14. As illustrated in said Fig. 14 the cover end flanges are shown as having one end thereof normal to the cover top panel 154 as is the extension flange 160 while the opposite extension flange 159 is illustrated as in the act of being made normal to the cover top panel 154 by arranging the remaining corner of said end flanges 168 and 169 in this position.

Figure 15:
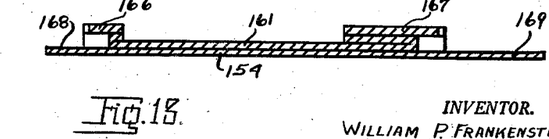
Fig. 15 is a perspective view of the carton and cover illustrating the same as it is shipped to the ultimate user or consumer.

It will now be appreciated that there has been provided a box or carton proper which has two hollow upstanding walls and an end or back wall with no other end or front wall. There has also been provided a platform to be received in the carton proper and on which is to be mounted goods such as toy wheeled vehicles together with means for securing at least certain of said toys against displacement. The cover is illustrated as having one end deep enough to completely close the open end of the box or carton so that when it is mounted in position a completely enclosed carton is provided to prevent inadvertent loss or removal of the toys from the package. Fig. 15 illustrates the carton with its platform therein together with a cover in position to be applied to the carton and further illustrates, in phantom lines, the cover as enclosing the carton proper.

It should be noted that with the cover or lid as disclosed in this application the outer surface of the end wall or back of the carton may contain suitable indicia indicative of the contents of the carton which need not be repeated on the lid or cover since said indicia can readily be observed and read since it is not obscured by the cover flange at that end of the carton or box.

Figures 16, 17, 20:
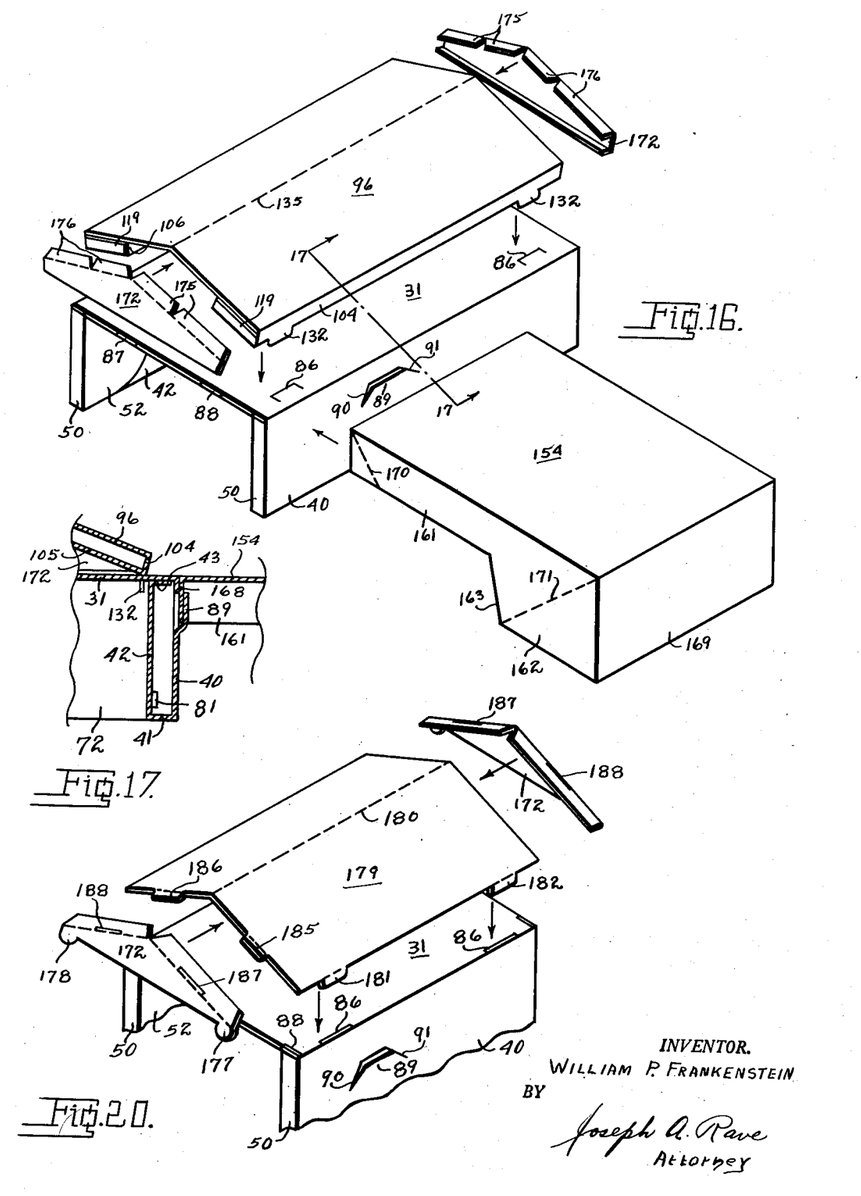
Fig. 16 is a perspective view of the various elements of the carton, platform and cover or lid showing the same as being assembled into a play or toy building.
Fig. 17 is a fragmentary vertical sectional view through the assembled building parts as seen from line 17—17 on Fig. 16.
Fig. 20 is a perspective view of the modified roof and roof end elements in position for erection with said modified elements taking the place of those illustrated in Fig. 16.

Upon removal of the goods, toys, from the carton or box the parts thereof previously described may be rearranged to form the play or toy building with which the said goods, toys, of the carton may be utilized. This rearrangement of the parts is illustrated in Figs. 16 and 17 where the carton or box proper is shown as inverted and resting on the carton side and end wall top wall members 41 and 71 with the bottom thereof acting as the ceiling and the open front end of the carton being the doorway into the building. The platform 95 has the block 144 removed, unless the block of Fig. 11 were employed, whereupon it is folded, slightly on its central score line 135 to form a peaked roof with the lugs 131 and 132 depending therefrom. The said lugs 131 and 132 are inserted into the slits caused by the U shaped cuts 86 in the carton bottom panel 31. Since, and as noted above, the locking panel 83 is provided with cutouts or recesses 93 and 94 and the locking flanges with slits 220 all of which correspond with the slits 86 no interference to the insertion of the lugs 131 and 132 is encountered.

Figure 7:
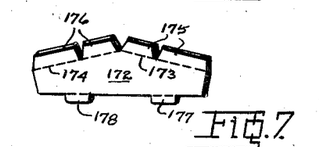
Fig. 7 is a perspective view of a piece that cooperates with the platform of Fig. 6 in forming the roof of the toy building of this invention.

In order that the roof may be completed there is included in the package, roof ends illustrated in Fig. 7. The roof ends are formed of paper or cardboard material and comprise a substantially rectangular body portion 172 provided with inclined score or fold lines 173 and 174 which respectively hingedly connect to the body portion a pair of tabs 175 and 176. Projecting from the lower end of the body portion 172 are lugs 177 and 178.

To complete the roof assembly in Fig. 16 the various tabs and lugs 175 to 178 are bent to be substantially normal to the body portion 172 whereupon the outermost tabs of each pair 175 and 176 is inserted into the platform tubes while the remaining tab of each of said pairs is disposed beneath the roof within the space between said tubes. The ears or lugs 177 and 178 are inserted into the apertures 87 and 88 to lie between the carton bottom 31 and the locking panel 83 superimposed thereon.

The lid or cover is now, similar to the carton proper, turned to rest on the lower edge of the wider portions 162 of the extension panels 159 and 160. The end flange 168, the shorter of the end flanges, is now hooked behind the keystone shaped lug or flap 89 in the adjacent outer wall member of the carton proper. With the parts in this position the portion of the top or cover extension flanges 159 and 160 which extends from the inclined cut 163 acts as a doorway to permit access within the space beneath the lid or cover top panel 154 with said lid or cover acting as an extension of the main building or as an auxiliary building connected with the main building. The interlocking of the carton and cover as a building and the securing of the roof thereto is illustrated in cross section in Fig. 17.

It is to be understood that the exposed surfaces of the carton proper, the cover or lid, the platform, and the roof end pieces are each properly and appropriately lithographed or printed to represent an appropriate building for the toys originally shipped and displayed in the carton. In other words, and assuming that the goods were the toy wheeled vehicles illustrated in Fig. 8, the parts of the carton and lid would be lithographed or printed to illustrate a garage and a filling station or service station with which the said toy wheeled vehicles may be appropriately used. It is to be understood that if the goods within the box or carton were of some other nature, such for example as toy or miniature airplanes, the carton and other parts may appropriately be lithographed or printed as an airplane hangar together with a service garage, operations office, or the like.

Figures 18, 19, 23, 24:
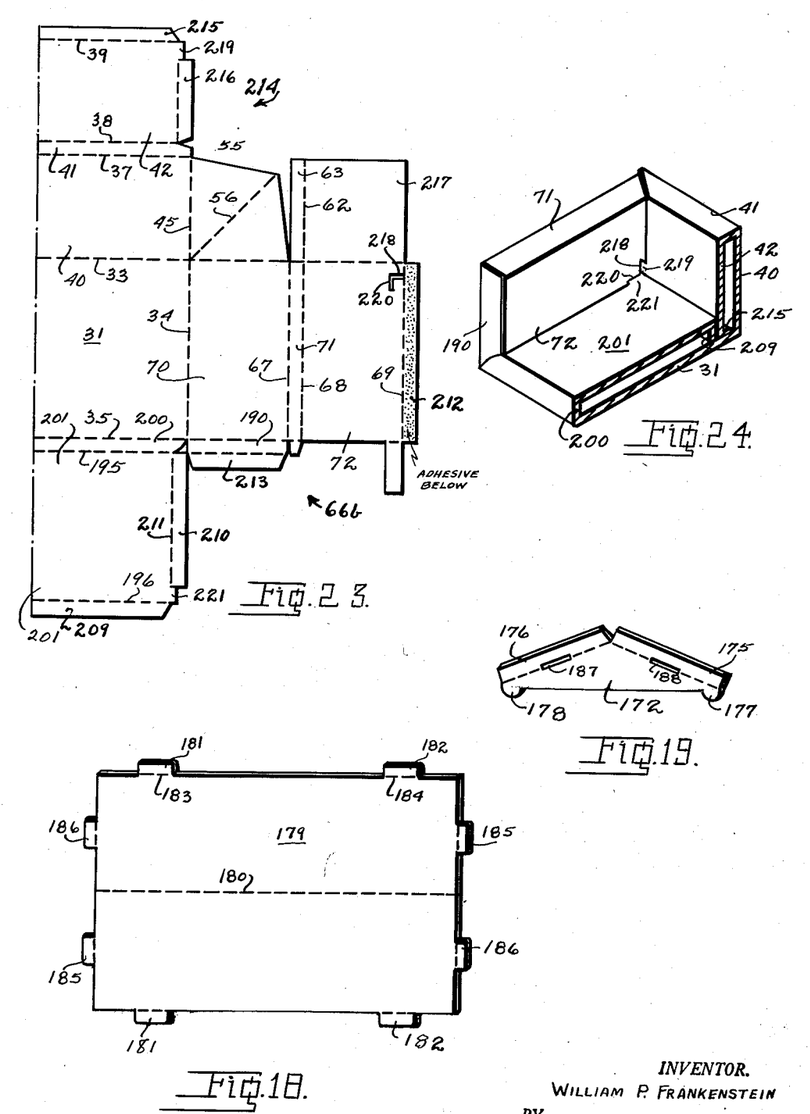
Fig. 18 is a perspective plan view of a roof element which could be supplied in place of the platform of Fig. 6 to form the toy building roof when the platform is not required.
Fig. 19 is a perspective plan view of a blank which forms the end of the roof of Fig. 18 and illustrates a modification over that illustrated in Fig. 7.
Fig. 23 is an extended plan view of a half blank similar to that illustrated in Fig. 21 but showing a further modification therein of a combined carton and platform with the carton having a single thickness bottom.
Fig. 24 is a perspective-sectional view of an erected carton formed from the blank of Fig. 23.

In the event that a platform or filler is not required to properly pack the goods therein a roof and roof ends may be supplied as extraneous pieces such for example as illustrated in Figs. 18 and 19 where each is formed of a single thickness material. The roof part, Fig. 18, is merely a rectangular piece of card or paper board material 179 having substantially centrally thereof a score or fold line 180 which will form the ridge of the roof. Extending from each of the longitudinal sides of the roof piece 179 are lugs 181 and 182 connected with the roof 179 through score or fold lines 183 and 184. By this construction the said lugs 181 and 182 may be bent downwardly for insertion in the slits 86. Extending from each of the remaining edges of the roof body portion 179 are lugs 185 and 186 which cooperate with the roof ends in securing the parts in proper position.

The roof ends as illustrated in Fig. 19 are quite similar to those illustrated in Fig. 7 except that instead of having tabs 175 and 176 to be inserted within the platform tubes is provided instead with elongated apertures 187 and 188 respectively receiving the ears 185 and 186 of the roof 179.

The assembly of these modified parts is clearly illustrated in Fig. 20 with the result of a toy building substantially similar to that above described and illustrated in Fig. 16.

Instead of having a relatively short locking flange 83 it may be desirable to have a double thickness bottom for the carton throughout its length and to accomplish this the said locking flange 83 is extended as shown in Fig. 1 in phantom lines at 189. In other words the locking panel 83 would be formed of a length substantially equal to the length of the carton bottom 31 and of a width substantially equal to the width of said bottom between the inner wall members 42. It will also be appreciated that the said extension would be provided with cutouts or recesses to coincide with the slits 86 at the end of the carton bottom 31 remote from the score or fold lines 32.

Figure 21:
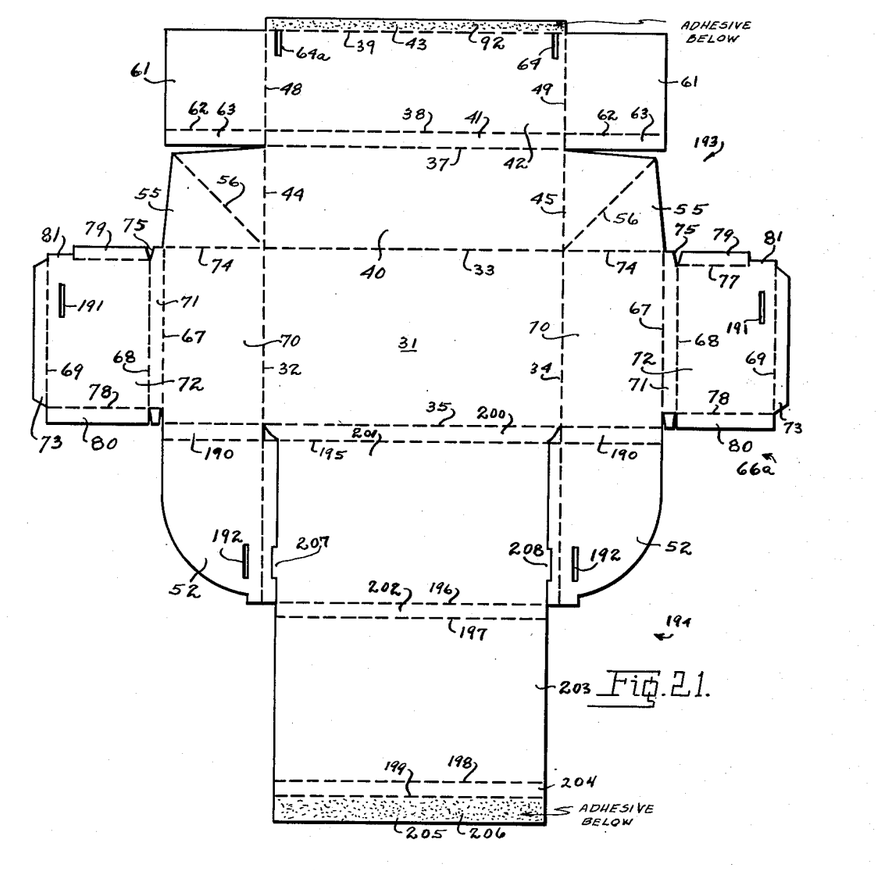
Fig. 21 is an extended plan view of a blank showing a platform integral with the carton whereby a double bottom for the carton is provided.
Figure 22:
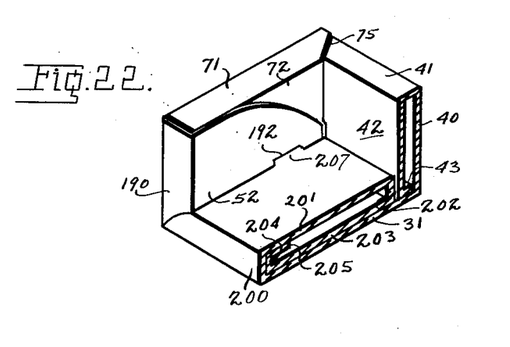
Fig. 22 is a perspective-sectional view of a carton erected from the blank of Fig. 21.

The foregoing description deals with a box or carton proper with which is employed a separate filler or platform. In the event it is desired that the platform be formed integral with the box proper the said platform may be utilized as an extension of the locking flap or panel 83. Such a construction is illustrated in Figs. 21 and 22 and requires relatively minor modifications from the blank of Fig. 1.

The said modification is illustrated as having the longer side removed and therefore involves a slight rearrangement of the remaining walls. Accordingly, the blank in Fig. 21 has connected to its bottom panel 31 by way of score or fold lines 32 and 34 substantially identical extensions 66a. As will be noted the extensions 66a are substantially identical with the extension 66 of Fig. 1 except that one of the bellows corner pieces 55 is replaced by the locking flap 52 which is connected to the side wall outer wall member 70 through a panel 190 which serves the same function as the panel 50 at the end of the side wall outer wall member 40 of Fig. 1. In addition the extension 66a has its inner wall member panel 72 provided with an opening 191 and the locking panel 52 likewise has an opening 192. The said openings 191 and 192 are aligned with one another in the erected carton for the purpose of locking the platform in position.

Connected with the bottom panel 31 through the score or fold line 33 is an extension 193 which forms the back wall of the modified carton. This back wall is substantially identical with the extension 36 of Fig. 1 and in the erected carton forms a wall having an inner, an outer and a top wall member with tucking and spacing flaps at the ends of these walls. The only specific modification being a second elongated aperture 64a, required because the extensions 66a are identical and each has a locking lug 81 to enter said locking apertures.

Connected with the said bottom panel along its opposite edge through the score or fold line 35 is an extension 194 having therein a plurality of score or fold lines 195, 196, 197, 198 and 199 which divide said extension 194 into a plurality of panels 200, 201, 202, 203, 204 and 205. In the erected carton, and as seen in Fig. 22, the panels 200, 202 and 204 constitute spacer panels for spacing the panels 201 and 203 from one another. In the manufacture of the blank adhesive 206 is applied to the under surface of the panel 205, as viewed in Fig. 22, whereupon it is folded onto the panels 203 and 204. The extension 194 is then folded on itself on score or fold line 197 to bring the adhesive 206 into engagement with the panel 201 at a zone commencing at and inwardly of the score or fold line 195. By this construction the panel 194 is shipped to the user in the folded condition just described requiring him to merely actuate the panels about their score or fold lines to form a tube whereupon the tube may be folded onto the carton bottom 31 into the position illustrated in Fig. 22.

From the foregoing it will be noted that the carton has an integral platform instead of a removable one as described in connection with Fig. 1 and it will be further noted that the bottom is of double thickness for strength. In order to lock the carton platform in this position and to lock the carton in its fully erected position the panel 201 has projecting from its opposite edges locking lugs 207 and 208 which enter the aligned apertures 191 and 192, above described, at their respective sides of the carton.

The general assembly of the blank of Fig. 21 into the carton of Fig. 22 follows the same steps as above described in connection with the blank of Fig. 1.

In the modification illustrated in Figs. 23 and 24 the bottom of the carton is only of single thickness instead of double thickness wherefore the panels 202, 203, 204 and 205 are omitted utilizing instead a spacer panel 209 connected to the panel 201 through the score or fold line 196. In addition a vertical spacing panel or flap 210 is connected to the opposite ends of the panel 201 through similar score or fold lines 211 at said ends of the panel 201. In the modification in Figs. 23 and 24 the side wall extensions 66b have at the end thereof a glue flap 212 which takes the place of the spacer flap 73 of Figs. 1 and 21. The outer wall member panel 70 instead of having the locking flap 52 beyond the side wall end closure panel 190 has an insertable flap 213 which is inserted into the interior of the hollow side wall after the wall has been erected from its flat folded position to its erected upright position.

The back wall extension indicated in Figs. 23 and 24 by the reference numeral 214 in this modification, and since the side walls have their inner wall members articulated to the carton bottom through the glue flap 212, the extension 214 has at its outer end a spacing panel or flap 215. It will further be noted that the tucking flaps 61 are removed from the panel 214 and in their place spacer flaps 216 substituted and that the side wall inner wall members of the flaps 66b carry the tucking flaps 217 to be enfolded by the back wall inner and outer wall members.

In the erected carton from the modified blank of Fig. 23, as illustrated in Fig. 24, there is provided an integral platform spaced above a single thickness bottom panel. In all other particulars the carton of Fig. 24 is substantially identical with that of Fig. 22 and Fig. 2. The modified carton of Fig. 24 is erected in the same manner as above described in connection with Fig. 2 except that instead of merely folding over the locking panel 83 the panels which form the platform are arranged in spaced apart parallel relation to one another. In order to hold the parts in their erected positions the inner wall member of extension 66b is provided with a substantially L-shaped aperture which receives in its vertical leg 218 the locking lug 219 projecting from the back wall inner wall member, and whose horizontal leg 220 receives the locking lug 221 from the platform panel 201.

In each of the modifications heretofore described the side walls have their wall members articulated upon themselves and the carton bottom panel 31. In the modification illustrated in Figs. 25 and 26 the said wall members are articulated solely on themselves. In order to accomplish this the side wall extension 36 of Fig. 1 is modified to the extent that the glue flap 43 is changed to a side wall bottom wall panel and is indicated in the drawings by the reference character 222. Connected with the bottom wall panel 222 through a score or fold line 223 is a glue flap 224 shown as of substantially the full width of the outer wall member panel 40.

Figure 25:
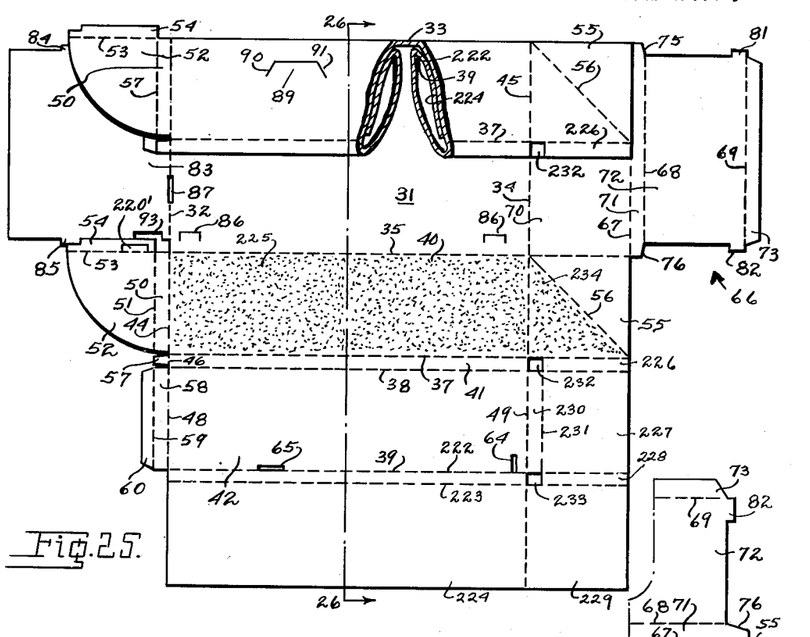
Fig. 25 is an extended plan view similar to that of Fig. 1 showing a modification therein for reinforcing the hollow side walls of the carton.
Figure 26:
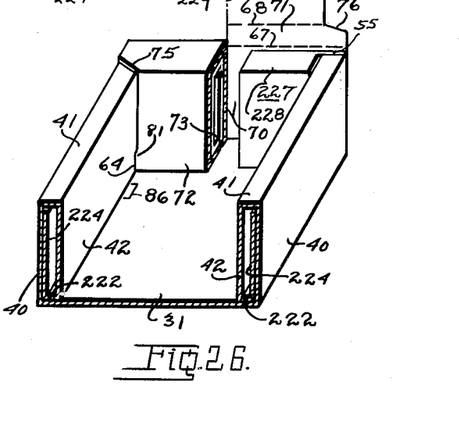
Fig. 26 is a perspective-sectional view of an erected carton from the blank of Fig. 25 taken on line 26—26 on said Fig. 25.

By this construction the side walls are formed as a rectangular tube fully, as mentioned above, articulated on themselves and which tube may be pre-folded to the form shown in Fig. 26 before being actuated about the score or fold line 35 to upstand from the carton bottom 31. In order to accomplish this the adhesive 92 may be applied to the under surface of the panel 224 as seen in Fig. 25 but is preferably applied to the upper surface of the side wall outer wall member 40 and which adhesive is indicated in the drawings by the reference numeral 225.

With this construction there may be employed the tucking flap 61 and spacer flap 63 of Fig. 1 or there may be employed a rectangular tucking flap wherein vertical and lateral spacing of the flap members is had. Accordingly the top wall member or panel 41, inner wall member or panel 42, bottom wall member or panel 222 and the glue flap 224 are respectively provided with an extension panel 226, 227, 228 and 229 with the outer wall member panel having between itself and its extensions a panel 230 located between the score or fold line 49 and a score or fold line 231 in the extension panel 227. Between the top and bottom wall panels 41 and 222 and their extension panels 226 and 228 there is respectively provided cutouts or apertures 232 and 233 which enable the proper folding of said panels.

After the blank of Fig. 25 has been formed as just described the glue flap and its extension flap are folded on the score or fold line 223 to lie in face contact with the inner wall member panel 42. The said glue flap 224 and the inner wall member panel 42 along with the bottom panel 222 and the extension panels 227, 228 and 229 are folded on the score or fold line 38 to bring the glue flap 24 into contact with the adhesive 225. It will be noted that the portion of the corner piece 55 between its diagonal score or fold line 56 and the adjacent end of the outer wall member panel 40 has applied thereto adhesive 234 to be adhesively secured to the glue flap extension panel 229.

It will be understood that the adhesive 225 of the extension 36a on the outer wall member is limited so as not to prevent the outward bending of the keystone shaped lug or flap 89. This can be accomplished by extending the adhesive only about two-thirds of the way from the score or fold line 35.

In the erection of the carton of Fig. 26 from the blank of Fig. 25 the same procedure is gone through with as above set forth. It should be noted however that the arranging of the rectangular tucking flap transversely of the carton bottom as illustrated in Fig. 26 automatically raises the end or back wall extension 66 as shown in said Fig. 26. In other words the side walls of the carton and the end or back wall thereof are each substantially simultaneously brought to their upright or normal position with respect to the carton bottom and which is accomplished by the folding on itself of the bellows corner pieces 55.

From the foregoing it will now be appreciated that there has been provided a construction which answers or accomplishes the objects initially set forth namely a sturdy shipping container which can be used as an attractive merchandise display device and further utilized as a play or toy building with or without auxiliary or attached buildings. It will be appreciated of course that each of the modifications in Figs. 22, 24 and 26 are adequately lithographed or printed to simulate the appearance of the building it represents and that with each of which cartons there is utilized a cover or lid as described in Fig. 14 for accomplishing all of the results or purposes set forth with respect thereto in connection with the basic blank of Fig. 1 and its erected carton of Figs. 2 and 15.

What is claimed is:

1. In a carton of the class described formed from a single blank comprising a bottom panel, side walls upwardly extending from two opposite edges of the bottom panel, tucking flaps from one end of each side wall, an end wall from one of the remaining edges of the bottom panel cooperating with the side walls tucking flaps for holding said side and end walls erected, flaps from the remaining ends of the side walls folded onto said side walls interiorly of the carton, hold down flanges at the bottom of said flaps overlying the bottom panel, a locking panel hingedly connected with the remaining edge of the bottom panel folded onto said bottom panel to engage the flaps hold down flanges so as to lock the carton in erected position and provide a three-walled carton with one side open, and means releasably securing the locking panel in hold-down flanges engaging position.

2. In a carton of the class described formed from a single blank comprising a bottom panel, side walls upwardly extending from two opposite edges of the bottom panel, tucking flaps from one end of each side wall, an end wall from one of the remaining edges of the bottom panel cooperating with the side walls tucking flaps for holding said side and end walls erected, flaps from the remaining ends of the side walls folded onto said side walls interiorly of the carton, hold down flanges at the bottom of said flaps overlying the bottom panel, a locking panel hingedly connected with the remaining edge of the bottom panel folded onto said bottom panel to engage the flaps hold down flanges so as to lock the carton in erected position and provide a three-walled carton with one side open, means releasably securing the locking panel in hold-down flanges engaging position, a member interiorly of the carton on the locking panel as a platform removably carried by the carton, said erected carton when reversed and resting on the edges of its side and end walls being usable as a play building and having slits formed in its bottom panel inwardly of its side walls, and tabs projecting from and carried by said removable member platform inserted in the bottom panel slits inwardly of its side walls securing said removable member-platform to said carton for use as a play or toy building with a roof thereabove and the open side of the carton affording an entrance into the play or toy building.

3. In a carton of the class described formed from a single blank comprising a bottom panel, side walls upwardly extending from two opposite edges of the bottom panel, tucking flaps from one end of each side wall, an end wall from one of the remaining edges of the bottom panel cooperating with the side walls tucking flaps for holding said side and end walls erected, flaps from the remaining ends of the side walls folded onto said side walls interiorly of the carton, hold down flanges at the bottom of said flaps overlying the bottom panel, a locking panel hingedly connected with the remaining edge of the bottom panel folded onto said bottom panel to engage the flaps hold down flanges so as to lock the carton in erected position and provide a three-walled carton with one side open, means releasably securing the locking panel in hold-down flanges engaging position, a member interiorly of the carton on the locking panel as a platform removably carried by the carton, said erected carton when reversed and resting on the edges of its side and end walls being usable as a play building and having slits formed in its bottom panel inwardly of its side walls and additional slits adjacent the hinge line of the locking panel, tabs projecting from and carried by said removable member platform inserted in the bottom panel slits inwardly of its side walls securing said removable member-platform to said carton for use as a play or toy building with a roof thereabove and the open side of the carton affording an entrance into the play or toy building, and extraneous end pieces for said roof conforming to the transverse outline of said roof, and lugs projecting from the roof extraneous end pieces into the bottom panel additional slits and into the removable member-platform removably securing said extraneous pieces in positions.

4. In a carton of the class described formed of a single blank comprising a bottom panel having upstanding side walls along two opposite edges of said bottom panel with said side walls including inner and outer wall members together with a top wall member, tucking flaps at one end of said side walls, an end wall at one of the remaining edges of said bottom panel comprising an inner and an outer wall member enfolding between them the side walls tucking flaps, a wall closure and spacing member carried by each of the side walls inner wall members for closing and spacing the ends thereof opposite to the ends of said side walls carrying the tucking flaps, foldable flaps at the ends of the side walls outer wall members opposite to the ends of said side walls which carry the tucking flaps adapted to be folded against said inner wall member interiorly of the carton and said foldable flaps including side wall end wall members, locking flanges at the bottoms of the foldable flaps adapted to overlie the carton bottom, a locking panel carried by the remaining edge of the bottom panel adapted to be folded onto said bottom panel to impinge the foldable flaps locking flanges and thereby lock the carton in erected position with said carton having two side walls and one end wall with the fourth end open, and means releasably securing the locking panel in locking flanges impinging position.

5. In a carton of the class described formed of a single blank comprising a bottom panel having upstanding side walls along two opposite edges of said bottom panel with said side walls including inner and outer wall members together with a top wall member, tucking flaps at one end of said side walls, an end wall at one of the remaining edges of said bottom panel comprising an inner and an outer wall member enfolding between them the side walls tucking flaps, a wall closure and spacing member carried by each of the side walls inner wall members for closing and spacing the ends thereof opposite to the ends of said side walls carrying the tucking flaps, foldable flaps at the ends of the side wall outer wall members opposite to the ends of said side walls which carry the tucking flaps adapted to be folded against said inner wall member interiorly of the carton and said foldable flaps including side wall end wall members, locking flanges at the bottoms of the foldable flaps adapted to overlie the carton bottom, a locking panel carried by the remaining edge of the bottom panel adapted to be folded onto said bottom panel to impinge the foldable flaps locking flanges and thereby lock the carton in erected position with said carton having two side walls and one end wall with the fourth end open, means releasably securing the locking panel in locking flanges impinging position a lid for said carton comprising a covering panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for a distance from their respective end flanges, said side flanges having an offset for connecting the dissimilar depth portions thereof, said carton being adapted to be used in an inverted position as a toy building and said cover being adapted to be used as an auxiliary connected toy building, and means for removably interlocking said carton and cover for use as connected toy buildings.

6. In a carton of the class described formed of a single blank comprising a bottom panel having upstanding side walls along two opposite edges of said bottom panel with said side walls including inner and outer wall members together with a top wall member, tucking flaps at one end of said side walls, an end wall at one of the remaining edges of said bottom panel comprising an inner and an outer wall member enfolding between them the side walls tucking flaps, a wall closure and spacing member carried by each of the side walls inner wall members for closing and spacing the ends thereof opposite to the ends of said side walls carrying the tucking flaps, foldable flaps at the ends of the side walls outer wall members opposite to the ends of said side walls which carry the tucking flaps adapted to be folded against said inner wall member interiorly of the carton and said foldable flaps including side wall end wall members, locking flanges at the bottoms of the foldable flaps adapted to overlie the carton bottom, a locking panel carried by the remaining edge of the bottom panel adapted to be folded onto said bottom panel to impinge the foldable flaps locking flanges and thereby lock the carton in erected position with said carton having two side walls and one end wall with the fourth end open, means releasably securing the locking panel in locking flanges impinging position a lid for said carton comprising a covering panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for a distance from their respective end flanges, said side flanges having an offset for connecting the dissimilar depth portions thereof, said carton being adapted to be used in an inverted position as a toy building and said cover being adapted to be used as an auxiliary connected toy building, means for removably interlocking said carton and cover for use as connected toy buildings, a member interiorly of the carton on the locking panel as a platform of a length and breadth corresponding to the length and breadth of the carton bottom within the walls thereof for supporting merchandise, said carton bottom panel having slits formed therein inwardly of its side walls, and tabs projecting from said platform removably securing the same to the carton bottom when the carton is used as a toy building to form a roof for the toy building.

7. In a carton of the class described formed of a single blank comprising a bottom panel having upstanding side walls along two opposite edges of said bottom panel with said side walls including inner and outer wall members together with a top wall member, tucking flaps at one end of said side walls, an end wall at one of the remaining edges of said bottom panel comprising an inner and an outer wall member enfolding between them the side walls tucking flaps, a wall closure and spacing member carried by each of the side walls inner wall members for closing and spacing the ends thereof opposite to the ends of said side walls carrying the tucking flaps, foldable flaps at the ends of the side walls outer wall members opposite to the ends of said side walls which carry the tucking flaps adapted to be folded against said inner wall members interiorly of the carton and said foldable flaps including side wall end wall members, locking flanges at the bottoms of the foldable flaps adapted to overlie the carton bottom, a locking panel carried by the remaining edge of the bottom panel adapted to be folded onto said bottom panel to impinge the foldable flaps locking flanges and thereby lock the carton in erected position with said carton having two side walls and one end wall with the fourth end open, means releasably securing the locking panel in locking flanges impinging position a lid for said carton comprising a covering panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for a distance from their respective end flanges, said side flanges having an offset for connecting the dissimilar depth portions thereof, said carton being adapted to be used in an inverted position as a toy building and said cover being adapted to be used as an auxiliary connected toy building, means for removably interlocking said carton and cover for use as connected toy buildings, a member interiorly of the carton on the locking panel as a platform of a length and breadth corresponding to the length and breadth of the carton bottom within the walls thereof for supporting merchandise, said carton bottom have formed therein slits inwardly of its side walls and having additional slits adjacent the hinge line of the locking panel, and tabs projecting from said platform removably securing the same to the carton bottom when the carton is used as a toy building to form a roof for the toy building, extraneous end pieces for said roof conforming to the outline of the roof, and lugs projecting from the roof extraneous end pieces into the bottom panel additional slits and into the removable member-platform for removably securing said extraneous end pieces in position.

8. In a carton of the class described formed from a single blank comprising a bottom panel, side walls upwardly extending from two opposite edges of the bottom panel, tucking flaps from one end of each side wall, an end wall from one of the remaining edges of the bottom panel cooperating with the side walls tucking flaps for holding said side walls and end wall erected, foldable flaps from the remaining ends of the side walls folded onto said side walls interiorly of the carton, a locking panel of a length and breadth substantially equal to the length and breadth of the bottom panel within the side walls and end wall hingedly connected with the remaining edge of the bottom panel folded onto said bottom panel and impinging the foldable flaps against said side walls, said side walls having slits formed therein, and locking lugs projecting from the locking panel into said side wall slits locking said locking panel in position.

9. In a carton of the class described formed from a single blank comprising a bottom panel having an end or back wall along one edge of said bottom panel with said end or back wall including inner and outer wall members together with a top wall member, tucking flaps at the ends of said end or back wall, side walls at two opposite edges of the bottom panel, each comprising an inner and an outer wall member enfolding between them the end or back wall tucking flaps, tucking flaps at the ends of the side walls adjacent the end or back wall, foldable flaps at the ends of the side walls outer wall members opposite to the ends of said side walls which carry the tucking flaps folded against the side walls inner wall members interiorly of the carton, a side wall end panel on each of said foldable flaps for closing the ends of the side walls, a locking panel of a length and breadth equal to the length and breadth of the bottom panel between the side and end or back walls inner wall members, spacing flaps hingedly connected to the sides and ends of the locking panel for spacing said locking panel above the bottom panel with one of said end spacing flaps hingedly connected to the bottom panel, said locking panel holding the side walls foldable flaps in operative position in the erected carton, said side walls having slits formed therein, and locking lugs projecting from the locking panel into said side wall slits locking the locking panel relative to the bottom panel.

10. In a carton of the class described formed from a single blank comprising a bottom panel having an end or back wall along one edge of said bottom panel with said end or back wall including inner and outer wall members together with a top wall member, tucking flaps at the ends of said end or back wall, side walls at two opposite edges of said bottom panel, each comprising an inner and an outer outer wall member enfolding between them the end or back wall tucking flaps, tucking flaps at the ends of the side walls adjacent the end or back wall, foldable flaps carried by the side walls outer wall members at their ends opposite to the ends of said side walls carrying the tucking flaps and said foldable flaps being folded against the side walls inner wall members interiorly of the carton, said foldable flaps including side wall end wall members, a platform comprising a pair of panels each of a length and width substantially equal to the length and width of the bottom panel within the inner wall members of said side and end walls, said platform panels being integrally hingedly connected to one another through spacing panels at their opposite ends, one of said spacing panels having one of its ends integrally hingedly connected to the carton bottom whereby said platform may be folded to operative position in superimposed relation with said carton bottom with the locking flaps between itself and the side walls inner wall members, and means releasably locking the platform in its operative superimposed position.

11. In a carton of the class described formed of a single blank comprising a bottom panel having side walls along two opposite edges of said bottom panel, said side walls including an outer wall member, a top wall member, an inner wall member, a bottom wall member and a glue flap beyond the bottom wall member all integrally hingedly connected to one another with the glue flap secured to the inner surface of the outer wall member whereby said wall members are articulated to one another and on the carton bottom panel, tucking flaps at one end of said side walls, an end wall at one of the remaining edges of said bottom panel comprising an inner and an outer wall member enfolding between them the side walls tucking flaps, foldable flaps at the ends of said side walls outer wall members opposite to the ends of said side walls which carry the tucking flaps and which foldable flaps are folded against said inner wall members interiorly of the carton and said foldable flaps including side wall end wall members, a locking panel hingedly carried by the remaining edge of the carton bottom panel folded onto the carton bottom panel for holding the foldable flaps against the side walls inner wall members and for holding the carton in erected position, and means releasably locking said locking panel in position.

12. In a carton of the class described formed from a single blank comprising a bottom panel side walls extending from two opposite edges of the bottom panel, tucking flaps from one end of each side wall, an end wall from one of the remaining edges of the bottom panel cooperating with the side walls tucking flaps for holding said side walls and end wall erected, foldable flaps from the remaining ends of the side walls adapted to be folded onto said side walls interiorly of the carton, a locking panel of a length and breadth substantially equal to the length and breadth of the bottom panel within the side walls and end wall hingedly connected with the remaining edge of the bottom panel folded onto said bottom panel and impinging the foldable flaps against said side walls, spacing flaps hingedly connected to the sides and ends of the locking panel for spacing said locking panel above the bottom panel with one of said end spacing flaps hingedly connected to the bottom panel, said locking panel holding the side walls foldable flaps in operative position in the erected carton, and means releasably locking said locking panel in position.

13. In a device of the class described a shipping and display carton comprising a bottom with a wall upstanding from each of three sides of said bottom and the fourth side open, a cover for the carton including a top member having depending from the edges thereof side and end flanges, one of the end flanges being equal in height to the depth of the carton for closing the open side of the carton during shipment while the opposed end flange is of less depth than that of the carton, the side flanges each having a depth for a portion of its length equal to the depth of its adjacent end flange and said side flanges being contoured to connect the dissimilar depth portions thereof, said carton being adapted to be used as a toy building when reversed and resting on the upper ends of the carton walls with the open side acting as a doorway into the toy building, said cover being adapted to be used as a toy building annex by resting the cover on the end flange and the portions of the side flanges which have a depth equal to that of the carton and with the end flange of less depth in face contact with a wall of the carton and the space below the cover side flanges of less depth acting as a doorway into the toy building annex, and cooperating means on said cover and carton for removably securing them to one another in operative toy building relationship, comprising a tab formed in the contacted carton wall at a point spaced from the upper end thereof to receive the free edge of the cover end flange of less depth.

14. In a device of the class described a shipping and display carton comprising a bottom with a wall upstanding from each of three sides of said bottom and the fourth side open, a cover for the carton including a top member having depending from the edges thereof side and end flanges, one of the end flanges being equal in height to the depth of the carton for closing the open side of the carton during shipment while the opposed end flange is of less depth than that of the carton, the side flanges each having a depth for a portion of its length equal to the depth of its adjacent end flange and said side flanges being contoured to connect the dissimilar depth portions thereof, said carton being adapted to be used as a toy building when reversed and resting on the upper ends of the carton walls with the open side acting as a doorway into the toy building, said cover being adapted to be used as a toy building annex by resting the cover on the end flange and the portions of the side flanges which have a depth equal to that of the carton and with the end flange of less depth in face contact with a wall of the carton and the space below the cover side flanges of less depth acting as a doorway into the toy building annex, cooperating means on said cover and carton for removably securing them to one another in operative toy building relationship, comprising a tab formed in the contacted carton wall at a point spaced from the upper end thereof to receive the free edge of the cover end flange of less depth, and a separate member forming a roof for the toy building removably secured to the carton bottom when in toy building position, and cooperating means for removably securing said separate member and carton bottom to one another, comprising the carton bottom having slits therein adjacent to sides thereof from which carton walls extend and lugs depending from separate member projecting into said carton bottom slits.

15. In a device of the class described a shipping and display carton comprising a bottom with a wall upstanding from each of three sides of said bottom and the fourth side open, a cover for the carton including a top member having depending from the edges thereof side and end flanges, one of the end flanges being equal in height to the depth of the carton for closing the open side of the carton during shipment while the opposed end flange is of less depth than that of the carton, the side flanges each having a depth for a portion of its length equal to the depth of its adjacent end flange and said side flanges being contoured to connect the dissimilar depth portions thereof, said carton being adapted to be used as a toy building when reversed and resting on the upper ends of the carton walls with the open side acting as a doorway into the toy building, said cover being adapted to be used as a toy building annex by resting the cover on the end flange and the portions of the side flanges which have a depth equal to that of the carton and with the end flange of less depth in face contact with a wall of the carton and the space below the cover side flanges of less depth acting as a doorway into the toy building annex, cooperating means on said cover and carton for removably securing them to one another in operative toy building relationship, comprising a tab formed in the contacted carton wall at a point spaced from the upper end thereof to receive the free edge of the cover end flange of less depth, a separate member forming a roof for the toy building removably secured to the carton bottom when in toy building position, cooperating means for removably securing said separate member and carton bottom to one another, comprising the carton bottom having slits therein adjacent to sides thereof from which carton walls extend and lugs depending from separate member projecting into said carton bottom slits, said separate member when in position on the carton bottom as a toy building roof having a transverse cross-section, extraneous end pieces conforming to said roof transverse cross-section, and cooperating means on said extraneous end pieces, carton bottom, and roof member for securing the same to one another comprising the carton bottom and roof member having slits therein and lugs projecting from the extraneous end pieces into the carton bottom and roof member slits.

16. In a device of the class described a shipping and display carton comprising a bottom with a wall upstanding from each of three sides of said bottom and the fourth side open, a cover for the carton including a top member having depending from the edges thereof side and end flanges, one of the end flanges being equal in height to the depth of the carton for closing the open side of the carton during shipment while the opposed end flange is of less depth than that of the carton, the side flanges each having a depth for a portion of its length equal to the depth of its adjacent end flange and said side flanges being contoured to connect the dissimilar depth portions thereof, said carton being adapted to be used as a toy building when reversed and resting on the upper ends of the carton walls with the open side acting as a doorway into the toy building, said cover being adapted to be used as a toy building annex by resting the cover on the end flange and the portions of the side flanges which have a depth equal to that of the carton and with the end flange of less depth in face contact with a wall of the carton and the space below the cover side flanges of less depth acting as a doorway into the toy building annex, cooperating means on said cover and carton for removably securing them to one another in operative toy building relationship, comprising a tab formed in the contacted carton wall at a point spaced from the upper end thereof to receive the free edge of the cover end flange of less depth, a removable platform for the carton for holding merchandise during shipment of the carton, said platform being provided substantially medially thereof with a score line, and cooperating means removably securing the platform to the carton bottom when the carton is reversed as a toy building with said platform-roof having the portions thereof on each side of its medial score line inclining outwardly and downwardly comprising the carton bottom having slits therein inwardly of two sides from which walls rise, and lugs depending from the edges of the platform-roof into said carton bottom slits.

17. In a device of the class described a shipping and display carton comprising a bottom with a wall upstanding from each of three sides of said bottom and the fourth side open, a cover for the carton including a top member having depending from the edges thereof side and end flanges, one of the end flanges being equal in height to the depth of the carton for closing the open side of the carton during shipment while the opposed end flange is of less depth than that of the carton, the side flanges each having a depth for a portion of its length equal to the depth of its adjacent end flange and said side flanges being contoured to connect the dissimilar depth portions thereof, said carton being adapted to be used as a toy building when reversed and resting on the upper ends of the carton walls with the open side acting as a doorway into the toy building, said cover being adapted to be used as a toy building annex by resting the cover on the end flange and the portions of the side flanges which have a depth equal to that of the carton and with the end flange of less depth in face contact with a wall of the carton and the space below the cover side flanges of less depth acting as a doorway into the toy building annex, cooperating means on said cover and carton for removably securing them to one another in operative toy building relationship, comprising a tab formed in the contacted carton wall at a point spaced from the upper end thereof to receive the free edge of the cover end flange of less depth, a removable platform for the carton for holding merchandise during shipment of the carton, said platform being provided substantially medially thereof with a score line, cooperating means removably securing the platform to the carton bottom when the carton is reversed as a toy building with said platform-roof having the portions thereof on each side of its medial score line inclining outwardly and downwardly comprising the carton bottom having slits therein inwardly of two sides from which walls rise, lugs depending from the edges of the platform-roof into said carton bottom slits, extraneous end pieces conforming to the said platform-roof transverse cross-section, and cooperating means on said extraneous end pieces, carton bottom, and platform-roof for securing the same to one another comprising the carton bottom and platform-roof having slits therein, and lugs projecting from the extraneous end pieces into the carton bottom and platform-roof slits.

WILLIAM P. FRANKENSTEIN.

REFERENCES CITED

The following references are of record in the file of this patent:

UNITED STATES PATENTS

| Number | Name | Date |
|---|---|---|
| Re. 21,158 | Frankenstein | July 25, 1939 |
| 1,932,429 | Wellman | Oct. 31, 1933 |
| 1,941,538 | Costello | Jan. 2, 1934 |
| 2,008,664 | Dowst | July 23, 1935 |
| 2,157,686 | Ballard | May 9, 1939 |
| 2,313,376 | Ullman | Mar. 9, 1943 |
| 2,355,206 | Davidson, Jr. | Aug. 8, 1944 |
| 2,457,812 | Epps | Jan. 4, 1949 |
| 2,465,169 | O'Connor | Mar. 22, 1949 |